*(12)* United States Patent
Schmitt et al.

(10) Patent No.: US 6,894,619 B1
(45) Date of Patent: May 17, 2005

(54) SENSOR FOR OPTICALLY DETECTING FOREIGN BODIES PARTICULARLY RAINDROPS ON A GLASS PANE

(75) Inventors: Patrick Schmitt, Lichtenau (DE); Norbert Hog, Buehl (DE); Bruno Hodapp, Achern-Oensbach (DE); Rainer Pientka, Renchen (DE); Hans Meier, Ottersweier (DE); Henry Blitzke, Buehl (DE); Martin Hager, Buehlertal (DE); Manfred Burkart, Iffezheim (DE); Jochen Benz, Sontheim (DE)

(73) Assignee: Robert Bosch GmbH, Stuttgart (DE)

( * ) Notice: Subject to any disclaimer, the term of this patent is extended or adjusted under 35 U.S.C. 154(b) by 475 days.

(21) Appl. No.: 10/030,833

(22) PCT Filed: Jul. 5, 2000

(86) PCT No.: PCT/DE00/02197

§ 371 (c)(1),
(2), (4) Date: Apr. 11, 2002

(87) PCT Pub. No.: WO01/05636

PCT Pub. Date: Jan. 25, 2001

(30) Foreign Application Priority Data

Jul. 17, 1999 (DE) .......................................... 199 33 640

(51) Int. Cl.⁷ .................... G08B 21/00; G01W 1/00; G01J 5/02; H02P 7/00; H05B 1/00
(52) U.S. Cl. .................... 340/604; 340/603; 340/618; 340/619; 73/170.17; 250/341.8; 219/209; 318/480; 318/483

(58) Field of Search ................................. 340/603–604, 340/618–619, 602; 318/480–483; 250/341.8; 219/209; 73/170.17; 356/445, 446, 448; 385/56, 59; 209/202, 203, 209, 602

(56) References Cited

U.S. PATENT DOCUMENTS

| | | | |
|---|---|---|---|
| 5,543,923 A | | 8/1996 | Levers et al. |
| 5,639,393 A | * | 6/1997 | Veltum et al. ............... 219/209 |
| 5,710,633 A | * | 1/1998 | Klappenbach et al. ...... 356/445 |
| 5,731,878 A | * | 3/1998 | Klappenbach et al. ...... 356/448 |
| 6,052,196 A | | 4/2000 | Pientka et al. .............. 355/445 |
| 6,299,319 B1 | | 10/2001 | Mertens et al. ............. 359/871 |

FOREIGN PATENT DOCUMENTS

| | | |
|---|---|---|
| DE | 44 10 217 A | 9/1995 |
| DE | 197 16 975 A1 | 10/1998 |

* cited by examiner

*Primary Examiner*—Jeffery Hofsass
*Assistant Examiner*—Lam Pham
(74) *Attorney, Agent, or Firm*—Michael J. Striker

(57) ABSTRACT

A sensor for optical detection of foreign bodies, in particular raindrops, on a window, in particular on the windshield of a motor vehicle, having a sensor element that is coupled to the inside of the window and having a fastening device, which is glued to the window, wherein the housing part has a fastening part pivotably attached to it, which can be brought into engagement with the fastening device by the clamping tension.

17 Claims, 7 Drawing Sheets

SENSOR FOR OPTICALLY DETECTING FOREIGN BODIES PARTICULARLY RAINDROPS ON A GLASS PANE

BACKGROUND OF THE INVENTION

The invention is based on a sensor DE 44 10 217 A1 has already disclosed a sensor with a number of housing parts. In this sensor, a fastening device is glued to a window. Two sliders, which are guided in an outer housing part and function as a fastening means, allow the outer housing part to engage with the fastening device. The sensor elements are affixed to an inner housing part, which is pressed against the window by means of a spring force acting on the outer housing part. This type of fastening, however, is complex, expensive, malfunction-prone, and therefore connected with high costs.

SUMMARY OF THE INVENTION

In accordance with the present invention, a sensor is proposed, for a sensor for optical detection of foreign bodies, in particular raindrops, on a window, in particular on the windshield of a motor vehicle, having a sensor element that can be coupled to the inside of the window, having at least one fastening device to be fastened, to the window, and having a housing part that contains at least the sensor element, where the sensor element can be coupled to the window by means of spring force, characterized in that the housing part has at least one fastening part attached to it, which can be brought into engagement with the fastening device by means of clamping tension.

The sensor according to the invention has the advantage that the fastening device is comprised of an easy-to-produce stamped and bent part and the spring elements are affixed to the housing in a predefined manner. As a result, no separate parts need to be installed and a single housing part suffices, which is pressed as a whole against the window. If the sensor element is firmly affixed to this housing part, then the number of moving parts of the sensor is reduced, which prevents a loss of adjustment due to vibrations of the window.

Advantageous modifications of the sensor unit according to the main claim are possible by means of the steps taken in the dependent claims.

The contact force of the sensor against the window surface can be kept uniform by means of two fastening parts disposed opposite each other.

If the fastening device has pins for engaging the fastening part, this makes it possible to simply remove the sensor at any time. It the fastening part is attached to the housing in a pivotable fashion and has elastic properties, then the contact force can be precisely adapted to the requirements. During installation, the fastening part is subjected to a continuous increase in force, which is further intensified when, during the rotation of the spring, the force is generated by an oblique plane on which the pins of the fastening device slide. Thus a greater contact force can be produced without complicating the installation.

Recesses in the fastening part for receiving the pins in the installed position assure a very high vibration resistance.

Advantageously, the fastening part has an oblong protrusion on its exterior. This stiffens the fastening part and achieves a better transmission of force during installation.

The manufacture of the fastening part as a stamped and bent part or as an injection molded plastic part is extremely simple and reduces costs.

In addition, if the fastening device is embodied is being of one piece, then particular spacing dimensions are of no concern when the fastening device is glued to the window, which results in a not insignificant time savings. A collar on the fastening device for receiving the sensor housing assures a rapid and simple installation.

An additional advantage is achieved through a modular design of the sensor that is comprised of 3 modules. The housing and the fastening parts constitute the first module, the printed circuit board with the plug connector or socket and the transmitters and receivers constitute the second module, and the optical body, coupling medium, and for example external light baffle constitute the third module. In addition to a precise and rapid assembly of the reciprocally matched components, this design also permits an uncomplicated replacement of individual components.

BRIEF DESCRIPTION OF THE DRAWINGS

An exemplary embodiment of the invention is shown in the drawings and will be explained in detail in the subsequent description.

DESCRIPTION OF THE PREFERRED EMBODIMENT

Figure 1:
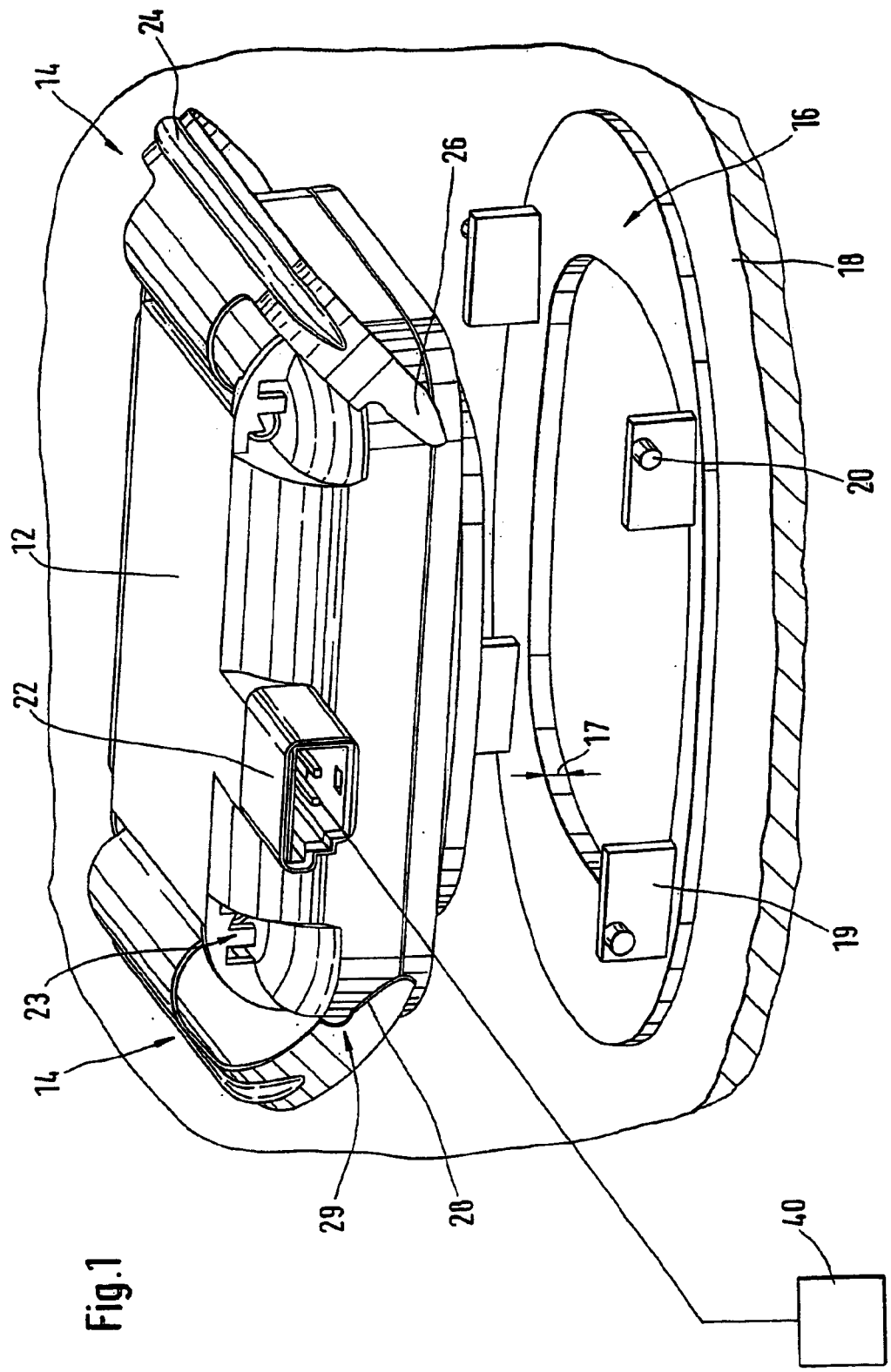
FIG. 1 is an oblique view of a sensor unit in a housing, with a fastening device before a fastening procedure.

FIG. 1 shows a sensor 10 according to the invention, including a housing part 12, two fastening parts 14, and a fastening device 16.

The fastening device 16 is embodied as a plate-shaped part with a recess in the center so that it can receive the housing part 12 in a collar-like fashion. On the side, the fastening device 16 has tabs 19 on which pins 20 are provided, which extend latterly outward. The tabs 19 extend essentially perpendicular to the window 18, as a result of which the pins 20 extend approximately parallel to the window 18. The fastening device 16 is embodied of one piece and is glued to the inside of a window 18.

The housing part 12 is comprised of a shell-shaped plastic part whose sides are provided with pocket-like formations 23, which extend parallel to the window 18 and can receive the fastening parts 14. Likewise, the housing part 12 has a socket 22, which serves as a communications interface of a sensor element 21 (FIG. 5) with a set of evaluation electronics 40.

Figure 2:
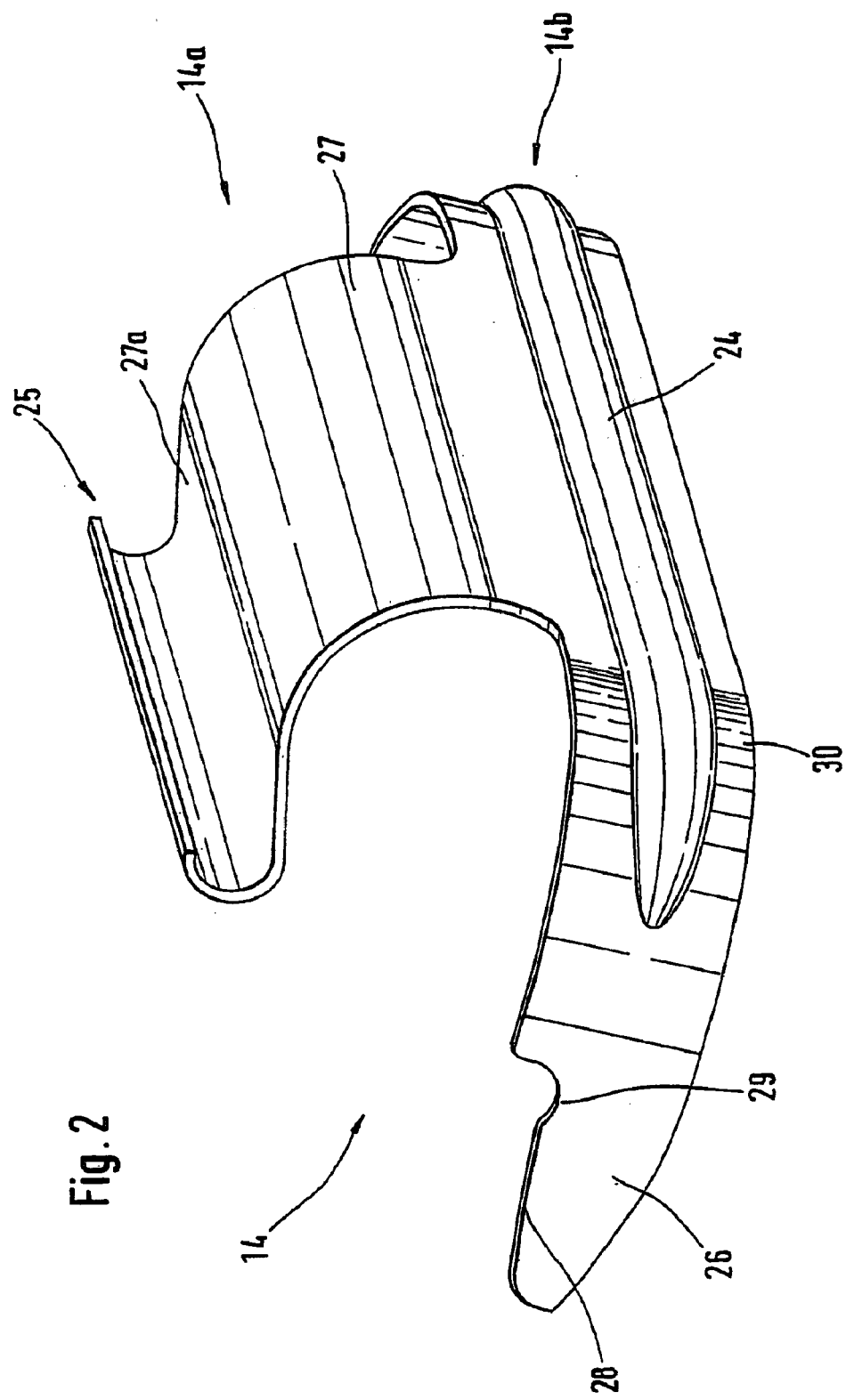
FIG. 2 is an enlarged oblique view of a fastening part.

FIG. 2 shows the fastening part 14 also shown in FIG. 1. The fastening part 14 is an essentially T-shaped stamped sheet metal part comprised of a base part 14a and a top part 14b. The base part 14a is comprised of 3 sections, a curved elastic region 27 as the first section, which is adjoined by a flat region 27a as a second section. The subsequent third section is comprised of a semi-tubular bend 25. The elastic region 27 of the first section curves in the opposite direction from the bend 25 of the third section. The top part 14b, which adjoins the elastic region 27 of the first section of the base part 14a, constitutes a retaining bracket 30 that also has three regions. The first, central region is comprised of a flat piece, the middle of which is provided with an oblong protrusion 24. This section is adjoined on both sides by a second region that is curved toward the bend 25. The ends of the top part 14b are formed by two trapezoidal bracket tabs 26 and thus constitute the third section of the retaining bracket 30. Each of these bracket tabs 26 has a recess 29 at its end oriented toward the second region. The trapezoidal form of the bracket tabs 26 constitute an oblique plane 28 that is disposed on the side oriented away from the window 18 in the installed position.

Figure 5:
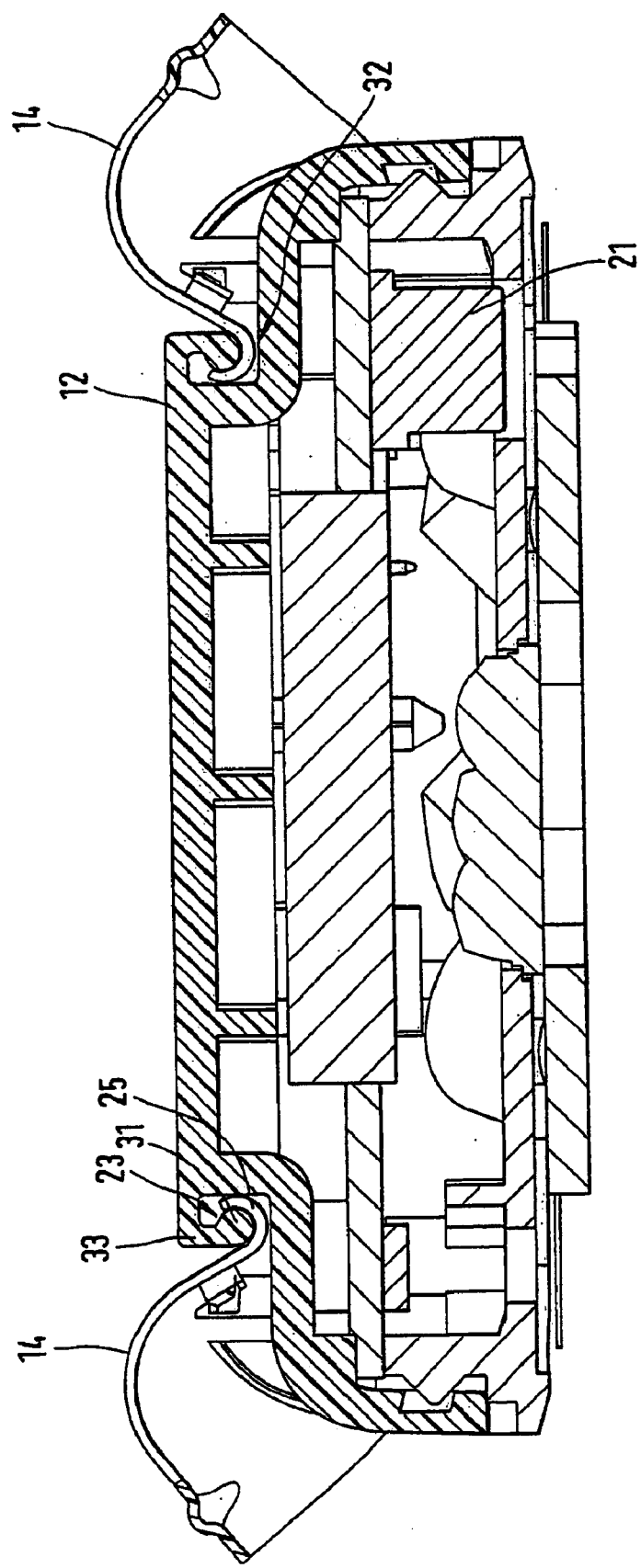
FIG. 5 shows a section through a sensor unit before a fastening procedure.

FIG. 5 shows a sectional view of the housing part 12, with the fastening parts 14 and the sensor element 21. The pocket-like formation 23 is constituted by a clamp-like overhang of 33 embodied at the top of the housing part 12, oriented away from the window 18. The overhang 33 terminates in a cylindrical formation 31 into which the bend 25 of the fastening part 14 can be movably inserted.

Figure 3:
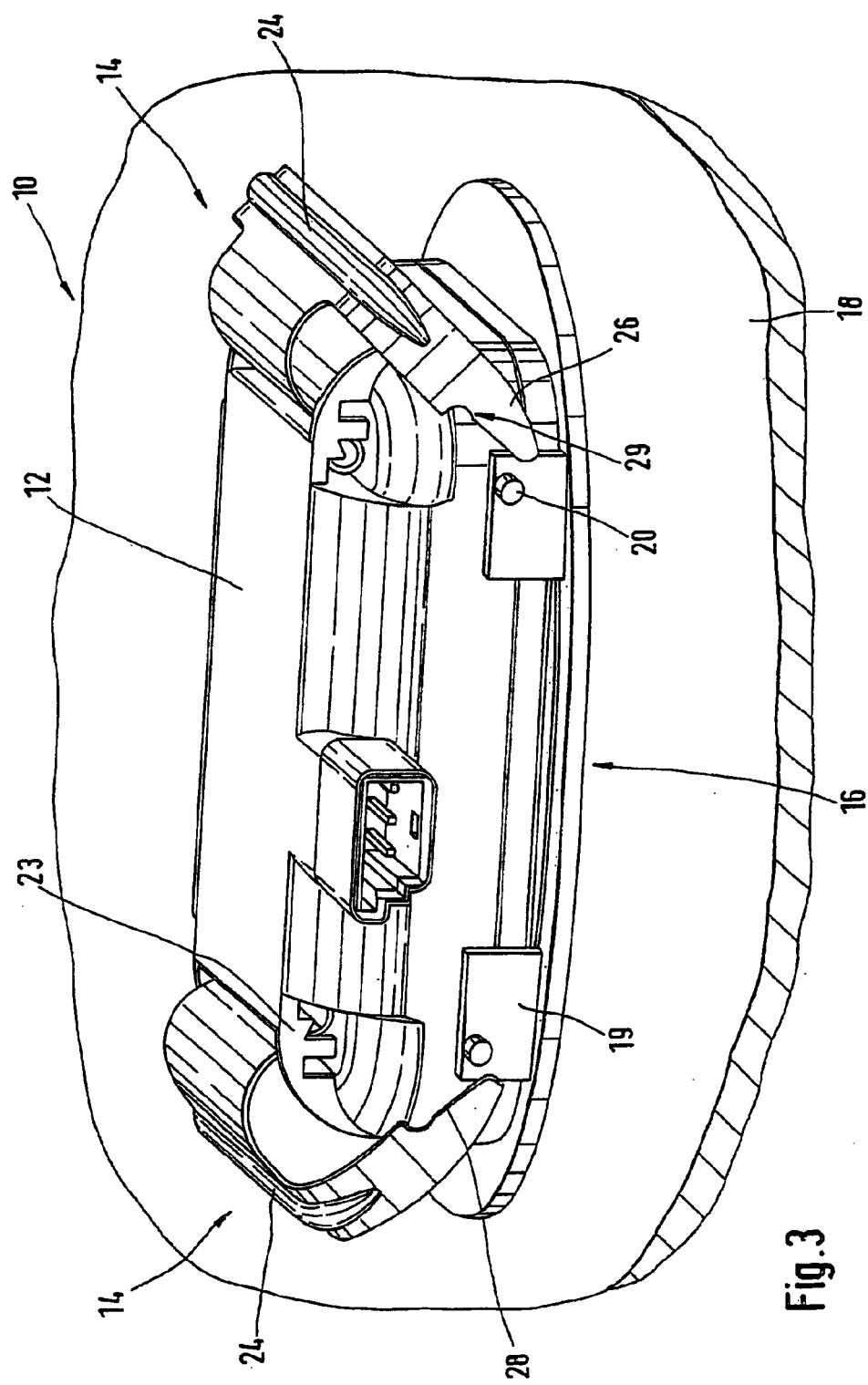
FIG. 3 is an oblique view of a sensor unit in a housing, with a fastening device, during a fastening procedure.

The cooperation of the fastening device 16, the housing part 12, and the fastening part 14 is shown in FIG. 3 and will be explained in detail below.

The fastening device 16 is glued to the window 18. The thickness 17 of the fastening device 16 produces a collar into which the housing part 12 is inserted. If the retaining brackets 30, which are fastened so that they can pivot by means of the bend 25 in the pocket-like formations 23 of the housing 12, are pressed toward the window 18, then the bracket tabs 26 slide along the pins 20. The pins 20 therefore slide in relation to the bracket tabs 26 along an oblique plane 28 produced by the trapezoidal form of the bracket tabs 26, as a result of which the curvature of the elastic region 27 is enlarged. Because the elastic fastening parts 14 strive to keep the curvature in the elastic region 27 constant, the housing part 12, together with the sensor element 21, is pressed toward the fastening device 16 and therefore toward the window 18 since the fastening device 16 receives the housing part 12 in a collar-like fashion. The ratio between the cylindrical formations 31 and the semi-tubular bend 25 here is dimensioned so that the dynamic effect does not occur between the overhang 33 and the fastening device 16, but rather between a contact face 32 and the fastening device 16.

Figure 4:
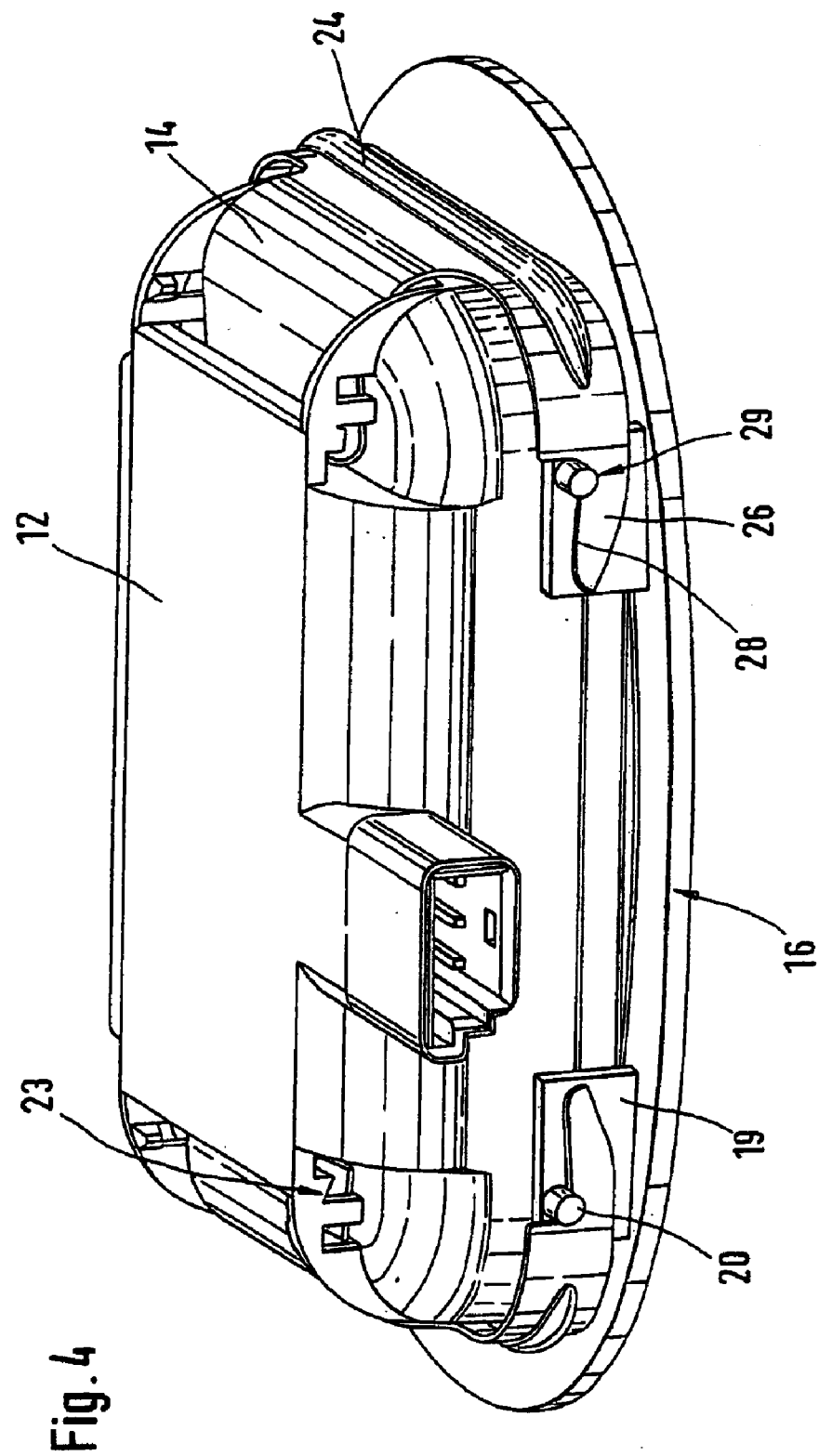
FIG. 4 is an oblique view of a sensor unit in a housing, with a fastening device, after a fastening procedure.

In the end position, as shown in FIG. 4, the pins 20 engage in detent fashion in the recesses 29 of the fastening part 14.

During installation, a force in the direction of the window 18 is required in order to cause the pins 20 to slide along the oblique plane 28. The oblong protrusions 24 stiffen the fastening part 14 and effectively prevent the installation tool from sliding off in the direction of the window 18.

In a variant of the exemplary embodiment, the fastening device 16 can also be comprised of a number of parts. It is also possible for the fastening device 16 to be attached to the window 18 in a manner other than a glued connection.

The fastening parts 14 can, for example, also be coated in order to improve grip during installation. The clamping force of the elastic region 27 can be precisely adjusted by means of a central recess 36 in the base part of the fastening part 14.

Figure 6:
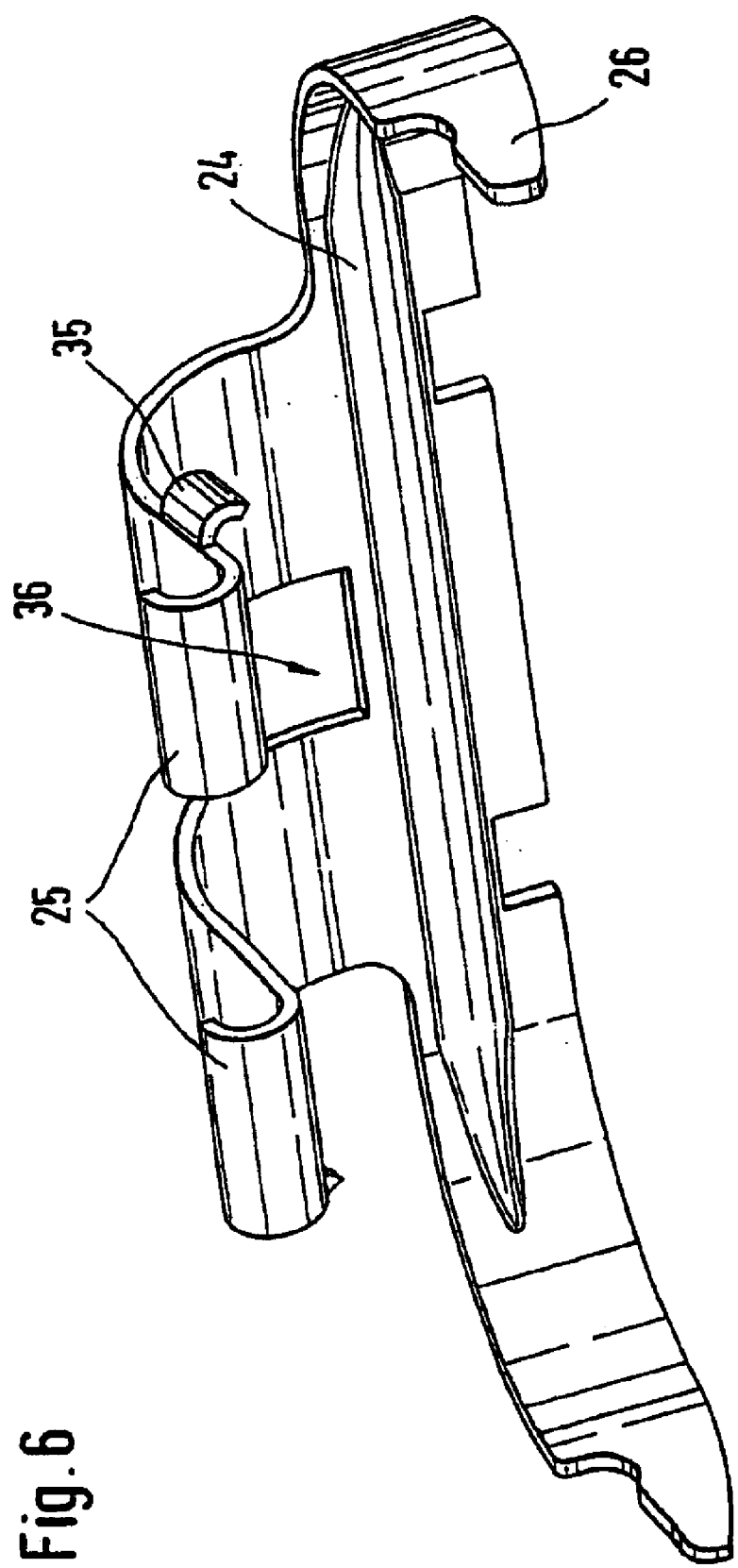
FIGS. 6 and 7 show respective embodiments for the fastening part and the housing part of the sensor.
Figure 7:
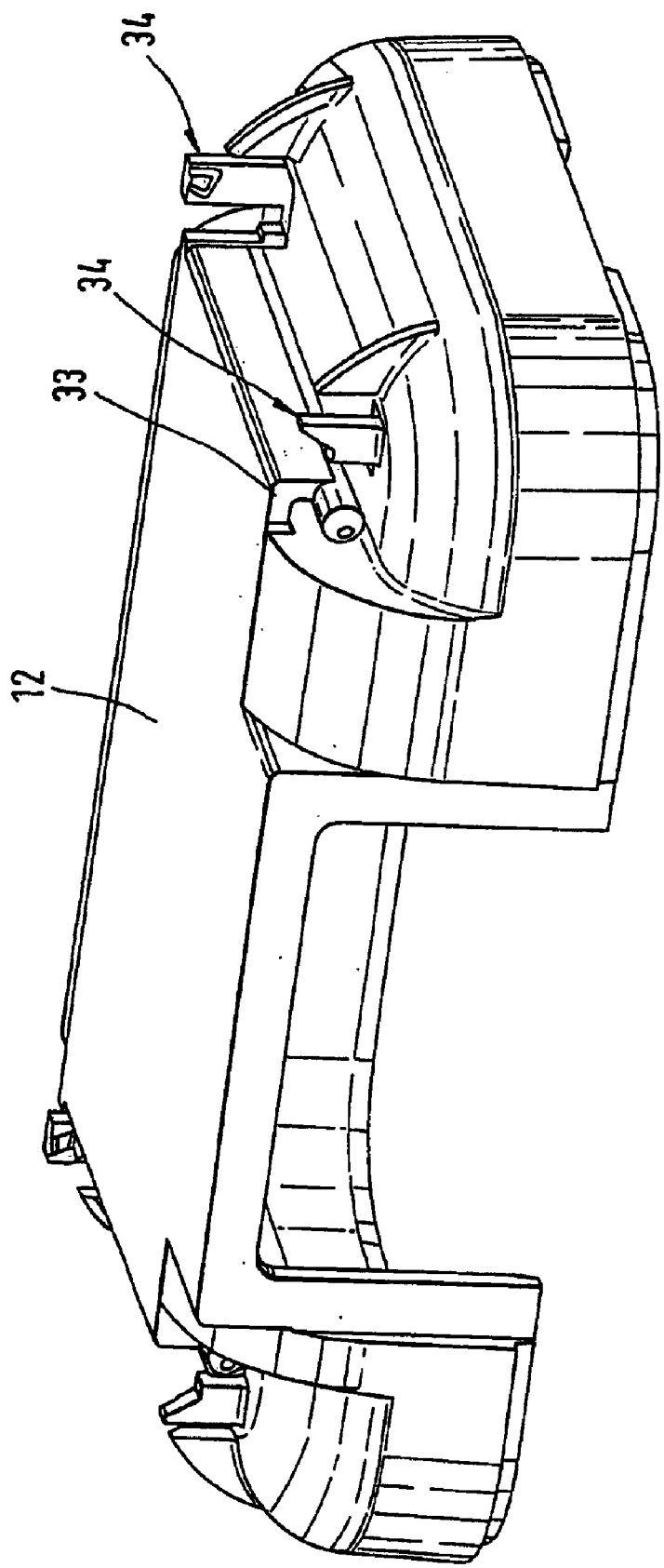

As shown in FIG. 6, the base part 14a of the fastening part 14 can also be provided with projections 35 that lock the fastening parts 14 in a definite position on the housing part 12 in the installed position. To that end, the housing part 12 has securing struts 34, as shown in FIG. 7.

For example, the sensor element 21 can also be screwed into the sensor housing 12 or elastically fastened in the sensor housing 12. Likewise, the socket 22 can be fastened to the sensor element 21 and connected by means of a recess in the housing part 12.

What is claimed is:

1. A sensor (10) for optical detection of foreign bodies, in particular raindrops, on a window, in particular on the windshield of a motor vehicle, having a sensor element (21) that can be coupled to the inside of the window, having at least one fastening device (18) to be fastened to the window, and having a housing part (12) that contains at least the sensor element (21), where the sensor element (21) can be coupled to the window (18) by means of spring force, characterized in that the housing part (12) has at least one fastening part (14) attached to it, which can be brought into engagement with the fastening device (16) by means of clamping tension.

2. The sensor according to claim 1, characterized in that the sensor element (21) is affixed to the housing part (12).

3. The sensor according to claim 1, characterized in that two fastening parts (14) are disposed opposite each other on the housing part (12).

4. The sensor according to claim 1, characterized in that the at least one fastening device (16) has pins (20) for engaging with the at least one fastening part (14).

5. The sensor according to claim 4, characterized in that the at least one fastening part (14) has recesses (29) for receiving the pins (20) in the installed position.

6. The sensor according to claim 1, characterized in that the at least one fastening part (14) is attached to the housing part (12) in a movable fashion and has elastic properties.

7. The sensor according to claim 1, characterized in that the at least one fastening part (14) can be brought into engagement with the at least one fastening device (16) by means of an oblique plane (28).

8. The sensor according to claim 1, characterized in that the at least one fastening part (14) has an oblong formation (24) on its exterior.

9. The sensor according to claim 1, characterized in that the at least one fastening part (14) is a stamped and bent part.

10. The sensor according to claim 1, characterized in that the at least one fastening part (14) is an injection molded plastic part.

11. The sensor according to claim 1, characterized in that the fastening device (16) is embodied as being of one piece.

12. The sensor according to claim 1, characterized in that the housing part (12) can be inserted in a collar-like fashion into the fastening device (16).

13. The sensor according to claim 1, characterized in that the sensor element (21) is fastened in the housing part (12) by being clipped into it.

14. A sensor (10) for optical detection of foreign bodies, in particular raindrops, on a window, in particular on the windshield of a motor vehicle, having a sensor element (21) that can be coupled to the inside of the window, having at least one fastening device (16) to be fastened to the window, and having a housing part (12) that contains at least the sensor element (21), where the sensor element (21) can be coupled to the window (18) by means of spring force, characterized by means of a design that is comprised of at least 3 components, in particular an optical body with a coupling medium, a plate with at least one transmitter and receiver, and a housing part (12) with fastening parts (14).

15. The sensor according to claim 1, characterized in that the at least one fastening device (16) to be fastened to the window is glued to the window.

16. The sensor according to claim 6, characterized in that the at least one fastening part (14) which is attached to the housing part (12) in the movable fashion is also attached to the housing part (12) pivotally.

17. A sensor according to claim 14, wherein the at least one fastening device (16) to be fastened to the window is glued to the window.

* * * * *